United States Patent

Akuzawa et al.

[11] Patent Number: 5,551,771
[45] Date of Patent: Sep. 3, 1996

[54] PROCESS FOR CONTROLLING WHEEL LONGITUDINAL FORCE IN VEHICLE

[75] Inventors: Kenji Akuzawa; Hiromi Inagaki, both of Wako, Japan

[73] Assignee: Honda Giken Kogyo Kabushiki Kaisha, Tokyo, Japan

[21] Appl. No.: 583,958

[22] Filed: Jan. 11, 1996

Related U.S. Application Data

[63] Continuation of Ser. No. 252,558, Jun. 1, 1994, abandoned.

[30] Foreign Application Priority Data

Jun. 3, 1993 [JP] Japan ..................... 5-133508

[51] Int. Cl.⁶ ..................................... B60T 8/30
[52] U.S. Cl. ........................... 303/186; 303/188
[58] Field of Search ................... 303/9.67, 9.68, 303/9.69, 22.1, 24.1, 113.4, 113.5, 146, 147, 186, 187, 188, 189; 364/426.02, 426.03

[56] References Cited

U.S. PATENT DOCUMENTS

| | | | |
|---|---|---|---|
| 3,642,328 | 2/1972 | Holland | 303/91 X |
| 4,576,419 | 3/1986 | Leiber | 303/DIG. 4 |
| 4,768,840 | 9/1988 | Sullivan et al. | 303/24.1 X |
| 4,795,219 | 1/1989 | Brearley et al. | 303/9.69 |
| 4,809,181 | 2/1989 | Ito et al. | |
| 4,824,185 | 4/1989 | Leiber et al. | 303/110 |
| 4,898,431 | 2/1990 | Karnopp et al. | |
| 5,188,434 | 2/1993 | Ruf et al. | |
| 5,267,783 | 12/1993 | Inoue et al. | |
| 5,275,475 | 1/1994 | Hartmann et al. | |
| 5,338,106 | 8/1994 | Rothen et al. | 303/100 X |
| 5,341,297 | 8/1994 | Zomotor et al. | |

FOREIGN PATENT DOCUMENTS

| | | |
|---|---|---|
| 3518221 | 4/1985 | Germany . |
| 3919347 | 2/1990 | Germany . |
| 3840456 | 6/1990 | Germany . |
| 4109925 | 10/1991 | Germany . |
| 4026626 | 2/1992 | Germany . |
| 4123235 | 11/1992 | Germany . |

*Primary Examiner*—Lee Young
*Attorney, Agent, or Firm*—Armstrong, Westerman, Hattori, McLeland & Naughton

[57] ABSTRACT

A total longitudinal force which is a sum total of the longitudinal forces applied to the plurality of wheels is detected or determined, and the longitudinal forces applied to the wheels are controlled on the basis of a front wheel-side target wheel longitudinal force and a rear wheel-side target wheel longitudinal force determined by distribution of the total longitudinal force at predetermined distribution proportions. When the slipping of a wheel is detected, the distribution proportions are changed, so that the target wheel longitudinal force is larger on one of the front and rear wheel sides in which more wheels are in non-slipping states.

2 Claims, 13 Drawing Sheets

PROCESS FOR CONTROLLING WHEEL LONGITUDINAL FORCE IN VEHICLE

This application is a continuation of application Ser. No. 08/252,558 filed Jun. 1, 1994, now abandoned.

BACKGROUND OF THE INVENTION

1. Field of the Invention

The present invention relates to a process for controlling the braking force or driving force as a wheel longitudinal force in a vehicle in which longitudinal forces applied to a plurality of wheels can be controlled at least on a front wheel side and on a rear wheel side.

2. Description of the Related Art

There is a process in which the braking force as the wheel longitudinal force can be controlled at least on the front wheel side and on the rear wheel side, and which is conventionally known, for example, from Japanese Patent Application Laid-open No. 237252/89.

In the above prior art process, the braking forces for the left and right front wheels are controlled collectively, and the braking forces for the left and right rear wheels are controlled independently. When the frictional coefficient of a travel road surface is different on the left and right sides of the vehicle, when the carried load variation is large, as well as when there is a difference in capacity among tires of four wheels (for example, when studless tires are mounted on only driving wheels, when one of left and right wheels is failed to be braked, or when a temper tire is mounted on a certain wheel), an anti-lock control (which will be referred to as an ABS control hereinafter) of any wheel liable to slip is started during braking and at this time point, a driver of the vehicle feels that the ABS control is executed. Therefore, even if a margin is left in the braking force for other wheels, the drive cannot further depress a brake pedal in many cases, and cannot obtain a maximum braking capacity for each wheel.

SUMMARY OF THE INVENTION

It is an object of the present invention to provide a process for controlling the wheel longitudinal force in a vehicle, wherein the capacity for the wheel can be exhibited to the maximum, without change of the total wheel longitudinal force corresponding to an operation by the vehicle driver.

To achieve the above object, according to the invention, a total longitudinal force, which is a sum total of the longitudinal forces applied to the plurality of wheels, is detected or determined, and the longitudinal forces applied to the wheels are controlled on the basis of a front wheel-side target wheel longitudinal force and a rear wheel-side target wheel longitudinal force determined by distribution of the total longitudinal force at predetermined distribution proportions. When the slipping of the wheel is detected, the distribution proportions are changed, so that the target wheel longitudinal force is larger on one of the front and rear wheel sides in which more wheels are in non-slipping states. Therefore, while the total wheel longitudinal force required by a vehicle occupant is made invariable, the maximum wheel longitudinal force can be exhibited within such range.

According to the present invention, in addition to the foregoing, in changing the distribution proportions, the change amount at the time when the front wheel-side target wheel longitudinal force is increased is determined larger than the change amount at the time when the rear wheel-side target wheel longitudinal force is increased. Therefore, the frequency of occurrence of slipping of the wheel is larger on the front wheel side, which can contribute to an improvement in stability of the vehicle.

In addition, the longitudinal forces applied to the plurality of wheels are controllable independently, and loads shared to the wheels in a stopped state of the vehicle are determined. The apparent direction and amount of displacement of the center position of gravity of the vehicle is calculated on the basis of a longitudinal acceleration of a lateral acceleration of the vehicle, and the apparent center of gravity position of the vehicle in accordance with apparent direction and amount of displacement is determined. When the slipping of the wheel is detected, the apparent center of gravity position of the vehicle is corrected so that it is displaced away from such wheel on a straight line connecting the wheel which is in the slipping state and the apparent center of gravity position of the vehicle, as viewed in a plane, and the determined shared load is corrected on the basis of a corrected apparent center of gravity position of the vehicle. Distribution proportions of the wheel longitudinal force are determined for every wheel on the basis of corrected shared loads. Therefore, when the distribution proportions are changed, it is possible to disperse the increment at a proper distribution to the wheels having an increased distribution proportion.

BRIEF DESCRIPTION OF THE DRAWINGS

The present invention will be described by way of an embodiment in connection with the accompanying drawings, in which.

DETAILED DESCRIPTION OF THE PREFERRED EMBODIMENTS

Figure 1:
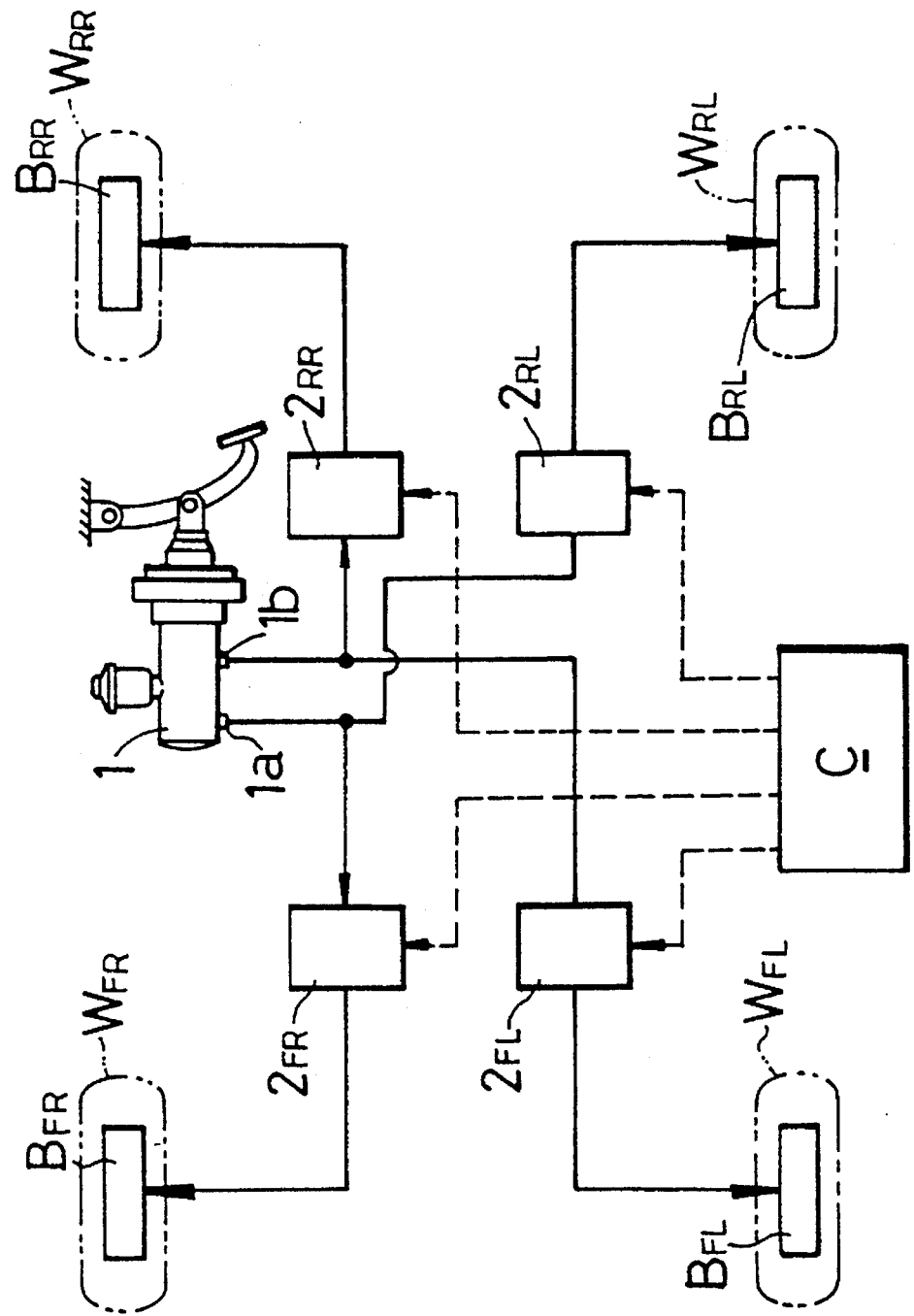
FIG. 1 is a diagram illustrating a braking system for a vehicle.

Referring first to FIG. 1, a right front wheel brake $B_{FR}$ is mounted to a right front wheel $W_{FR}$ of a four-wheel vehicle which is of a front engine and front drive type (FF type). A left front wheel brake $B_{FL}$ is mounted to a left front wheel $W_{FL}$. A right rear wheel brake $B_{RR}$ is mounted to a right rear wheel $W_{RR}$, and a left rear wheel brake $B_{RL}$ is mounted to a left rear wheel $W_{RL}$. The brakes $B_{FR}$, $B_{FL}$, $B_{RR}$, $B_{RL}$ are of the same specification.

A tandem type master cylinder 1 includes a pair of output ports 1a and 1b. The output port 1a is connected to the right front wheel brake $B_{FR}$ through a modulator $2_{FR}$ capable of controlling the fluid pressure and also to the left rear wheel brake $B_{RL}$ through a modulator $2_{RL}$. The other output port 1b is connected to the left front wheel brake $B_{FL}$ through a modulator $2_{FL}$ and also the right rear wheel brake $B_{RR}$ through a modulator $2_{RR}$.

The operations of the modulators $2_{FR}$, $2_{FL}$, $2_{RR}$, $2_{RL}$, i.e., braking fluid pressures applied to the brakes $B_{FR}$, $B_{FL}$, $B_{RR}$, $B_{RL}$ are controlled independently by a control unit C.

Figure 2:
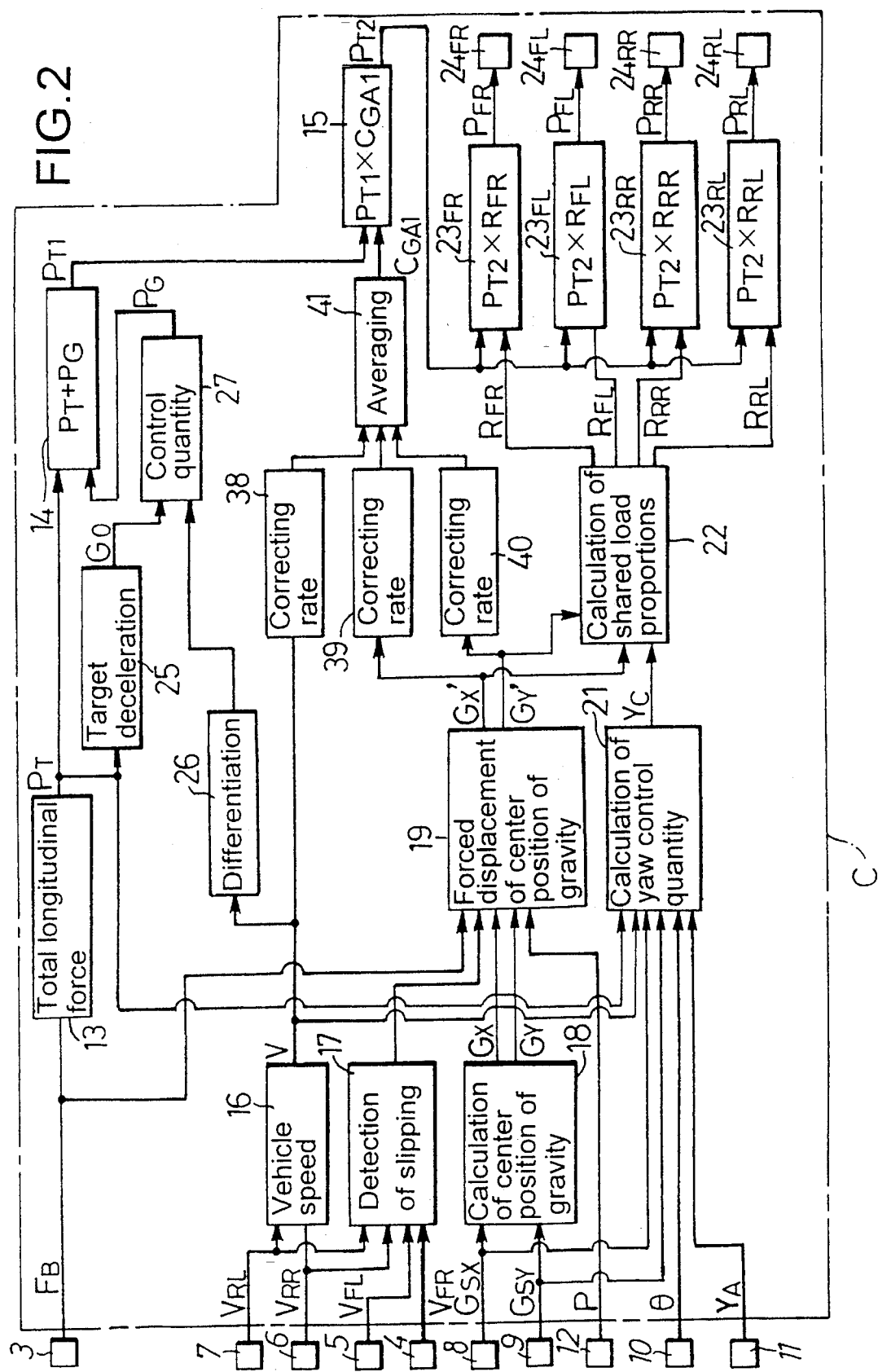
FIG. 2 is a block diagram illustrating an arrangement of a control system.

Referring to FIG. 2, connected to the control unit C are a depression force detecting sensor 3 for detecting a brake depression force $F_B$ as a quantity of braking operation by a brake pedal (not shown), wheel speed sensors 4, 5, 6, 7 for detecting wheel speeds, $V_{FR}$, $V_{FL}$, $V_{RR}$, $V_{RL}$ of the wheels $W_{FR}$, $W_{FL}$, $W_{RR}$, $W_{RL}$, respectively, a longitudinal acceleration detecting sensor 8 for detecting a longitudinal acceleration $G_{SX}$ of the vehicle, a lateral acceleration detecting sensor 9 for detecting a lateral acceleration $G_{SY}$, a steering angle detecting sensor 10 for detecting a steering angle $\Theta$ as a quantity of steering operation by a steering handle (not shown), a yaw rate detecting sensor 11 for detecting a yaw rate $Y_A$ as a quantity of vehicle turned actually, and a braking fluid pressure sensor 12 for detecting a braking fluid pressure $P_B$.

The control unit C includes a total longitudinal force determining means 13 for determining a total braking fluid pressure $P_T$ for all four wheels on the basis of a detection value detected by the depression force detecting sensor 3, a deceleration correcting means 14 for correcting the total braking fluid pressure $P_T$ determined in the total longitudinal force determining means 13 by a deceleration control quantity $P_G$ to provide a first corrected total braking fluid pressure $P_{T1}$, a gain correcting means 15 for applying a gain correction to the first corrected total braking fluid pressure $P_{T1}$ t provide a second corrected total braking fluid pressure $P_{T2}$a vehicle speed calculating means 16 for calculating a vehicle speed V on the basis of wheel speeds $V_{RR}$, $V_{RL}$ of the right and left rear wheels $W_{RR}$, $W_{RL}$ which are follower wheels, a slip detecting means 17 for detecting which wheel is fallen into a slipping state during braking on the basis of the speeds $V_{FR}$, $V_{FL}$, $V_{RR}$, $V_{RL}$ of the wheels $W_{FR}$, $W_{FL}$, $W_{RR}$, $W_{RL}$, a gravity-center position calculating means 18 for calculating the direction and quantity of apparent displacement of the center position of gravity of the vehicle on the basis of a longitudinal acceleration $G_{SX}$ and a lateral acceleration $G_{SY}$, a gravity-center position forced-displacement quantity calculating means 19 for calculating an amount of forced displacement of the center position of gravity to correct the apparent center of gravity determined in the gravity-center position calculating means 18 when the slipping of the wheel has been detected by the slip detecting means 17, a yaw control quantity calculating means 21 for calculating a yaw control quantity $Y_C$ on the basis of the total braking fluid pressure $P_T$, the vehicle speed V, the longitudinal acceleration $G_{SX}$, the lateral acceleration $G_{SY}$, the steering angle $\Theta$ and the detection yaw rate $Y_A$, a shared-load proportion calculating means 22 for calculating shared-load proportions $R_{FR}$, $R_{FL}$, $R_{RR}$, $R_{RL}$ for the four wheels on the basis of the calculated quantities determined in the gravity-center position forced-displacement amount calculating means 19 and the yaw control quantity calculating means 21, right front, left front, right rear and left rear wheel braking fluid pressure calculating means 23 $23_{FL}$, $23_{RR}$, $23_{RL}$ for calculating target braking fluid pressures $P_{FR}$, $P_{FL}$, $P_{RR}$, $P_{RL}$ of the wheel brakes $B_{FR}$, $B_{FL}$, $B_{RR}$ and $B_{RL}$ as target longitudinal forces for the wheels on the second corrected total braking fluid pressures $P_T$ and the shared-load proportions $R_{FR}$, $R_{FL}$, $R_{RR}$, $R_{RL}$, respectively, and drive means $24_{FR}$, $24_{FL}$, $24_{RR}$ and $24_{RL}$ for driving the modulators $2_{FR}$, $2_{FL}$, $2_{RR}$, $2_{RL}$ on the basis of the target braking fluid pressures $P_{FR}$, $P_{FL}$, $P_{RR}$, $P_{RL}$, respectively.

Figure 3:
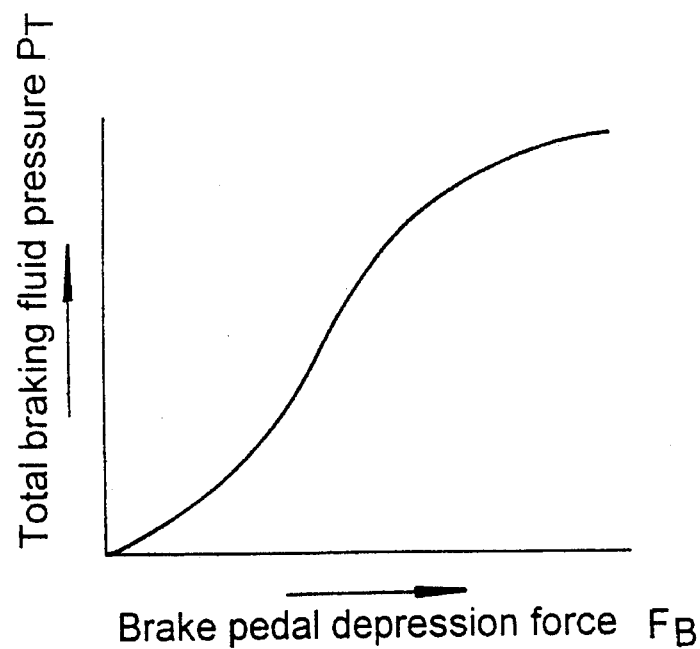
FIG. 3 is a graph illustrating an established map of the total hydraulic braking pressure according to the brake depression force.

The total longitudinal force determining means 13 determines a total braking force which is a sum total of wheel longitudinal forces applied to the four wheels in accordance with the brake depression force $F_B$. When the brakes $B_{FR}$, $B_{RR}$, $B_{RL}$, $B_{RL}$ of the same specification are mounted to the four wheels $W_{FR}$, $W_{FL}$, $W_{RR}$, $W_{RL}$, respectively, braking forces exhibited by the brakes $B_{FR}$, $B_{FL}$, $B_{RR}$, $B_{RL}$ are proportional to the braking fluid pressures controlled by the modulators $2_{FR}$, $2_{FL}$, $2_{RR}$, $2_{RL}$, respectively, and it is possible to calculate the total braking force as the total longitudinal force in the term of a total braking fluid pressure. Therefore, the total braking fluid pressure $P_T$ applied to the brakes $B_{FR}$, $B_{FL}$, $B_{RR}$, $B_{RL}$ is determined by the total longitudinal force determining means 13 on the basis of the map previously defined in accordance with the brake depression force $F_B$, as shown in FIG. 3.

The total braking fluid pressure $P_T$ determined in the total longitudinal force determining means 13 is supplied to the target deceleration determining means 25, where a target deceleration $G_0$ is determined in accordance with the total braking fluid pressure $P_T$. The vehicle speed V, determined in the vehicle speed calculating means 16, is supplied to a differentiating means 26, where a vehicle deceleration is determined by differentiating the vehicle speed. Such vehicle deceleration and the target deceleration $G_0$ are supplied to a control quantity calculating means 27, where a deceleration control quantity $P_G$ is calculated on the basis of a deviation between the target deceleration $G_0$ and the detected vehicle deceleration.

The total braking fluid pressure $P_T$ and the deceleration control quantity $P_G$ are supplied to the deceleration correcting means 14, where the deceleration control quantity $P_G$ is added to the total braking fluid pressure $P_T$ to provide a first corrected total braking fluid pressure $P_{T1}$.

The longitudinal acceleration $G_{SX}$ detected by the longitudinal acceleration sensor 8 and the lateral acceleration $G_{SY}$ detected by lateral acceleration sensor 9 are supplied to the gravity-center position calculating means 18. If coordinates of the center position of gravity of the vehicle in a resting state are represented by ($G_{X0}$, $G_{Y0}$), the gravity-center position calculating means 18 calculates the direction and amount of apparent displacement of the center position of gravity with a variation in load and also calculates coordinates ($G_X$, $G_Y$) indicating an apparent displaced point of the center of gravity position on the basis of such calculated value.

Figure 4:
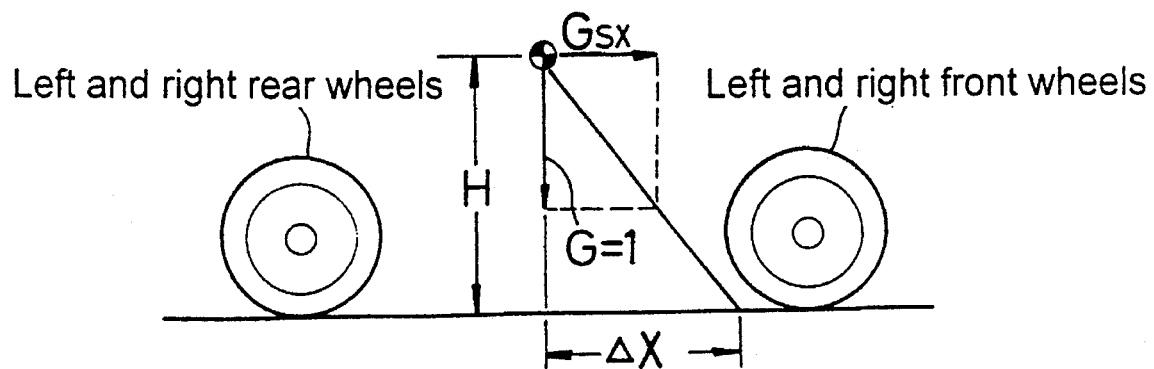
FIG. 4 is a diagram for explaining the apparent displacement of the center position of gravity in a longitudinal direction of the vehicle.

Referring to FIG. 4, if the height of the center of gravity position from a grounded road surface is represented by H, and a force of gravity G is equal to 1, the apparent amount $\Delta X$ of displacement of the center of gravity position in the lateral direction of the vehicle, i.e., in an X direction is determined according to $\Delta X = G_{SX} \times H$.

Figure 5:
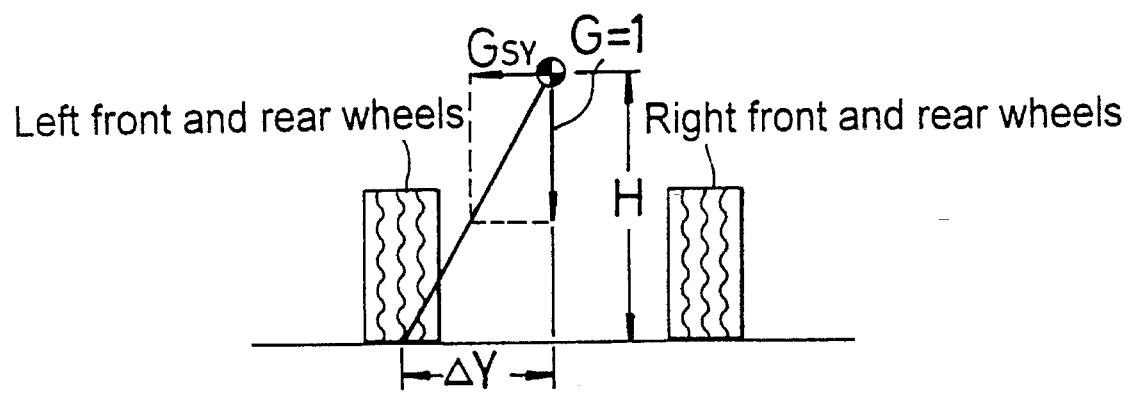
FIG. 5 is a diagram for explaining the apparent displacement of the center position of gravity in a lateral direction of the vehicle.

Referring to FIG. 5, if the height of the center of gravity position from a grounded road surface is represented by H, and a force of gravity G is equal to 1, the apparent amount $\Delta Y$ of displacement of the center of gravity position in the lateral direction of the vehicle, i.e., in a Y direction is determined according to $\Delta Y = G_{SY} \times H$.

Figure 6:
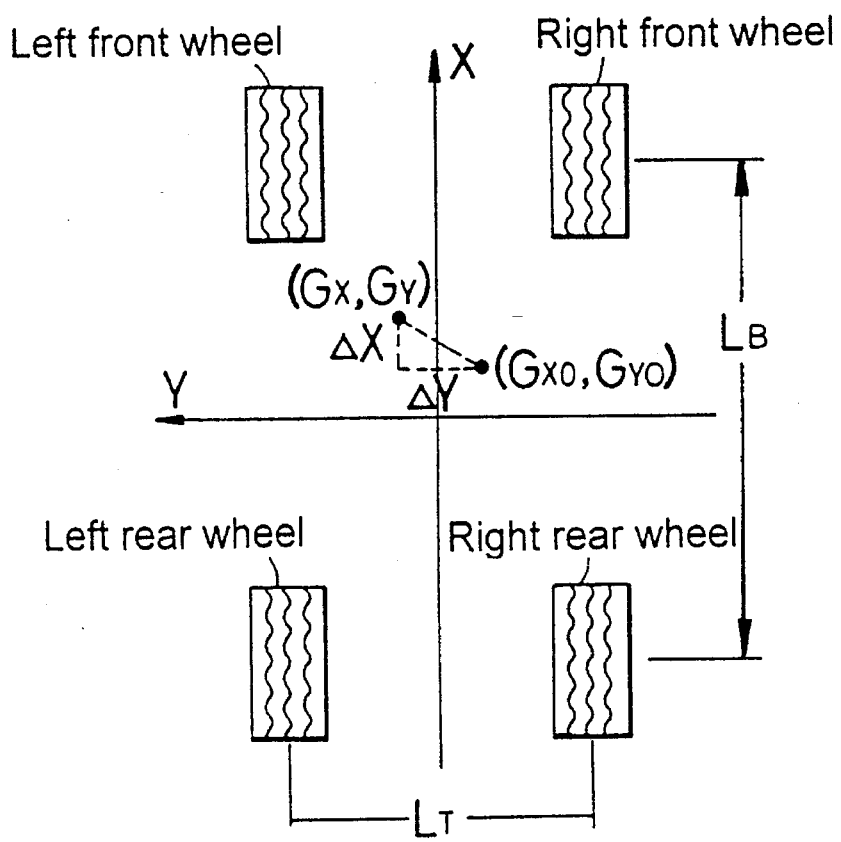
FIG. 6 is a diagram for explaining the apparent variation in center position of gravity on X and X coordinates.

Further, if the total weight of the vehicle is represented by $WT_T$; the shared loads of the right front wheel $W_{FR}$, the left front wheel $W_{FL}$, the right rear wheel $W_{RR}$, and the left rear wheel $W_{RL}$ in the resting state of the vehicle are by $WT_{FR}$, $WT_{FL}$, $WT_{RR}$, $WT_{RL}$ $WT_T(WT_{FR}=WT_{FR}+WT_{RR}+WT_{RL}+WT_{RL})$, respectively; and the wheel base is by $L_B$ and the tread is by $L_T$, as shown in FIG. 6, the X coordinate $G_{XO}$ of the center of gravity position in the resting state is represented by a following expression:

$$G_{XO} = \{L_B \cdot (WT_{FR}+WT_{FL})/WT_T\} - L_T/2 \quad (1)$$

and the Y coordinates $G_{YO}$ of the center position of gravity in the resting state is represented by a following expression:

$$G_{YO} = \{L_B \cdot (WT_{RR}+WT_{RL})/WT_T\} - L_T/2 \quad (2)$$

The X coordinate $G_X$ of the apparent center of gravity position, as a result of a variation in load during traveling of the vehicle, is represented by $G_X = G_{XO} + \Delta X$, and the Y coordinate $G_Y$ is represented by $G_Y = G_{YO} + \Delta Y$.

Figure 7:
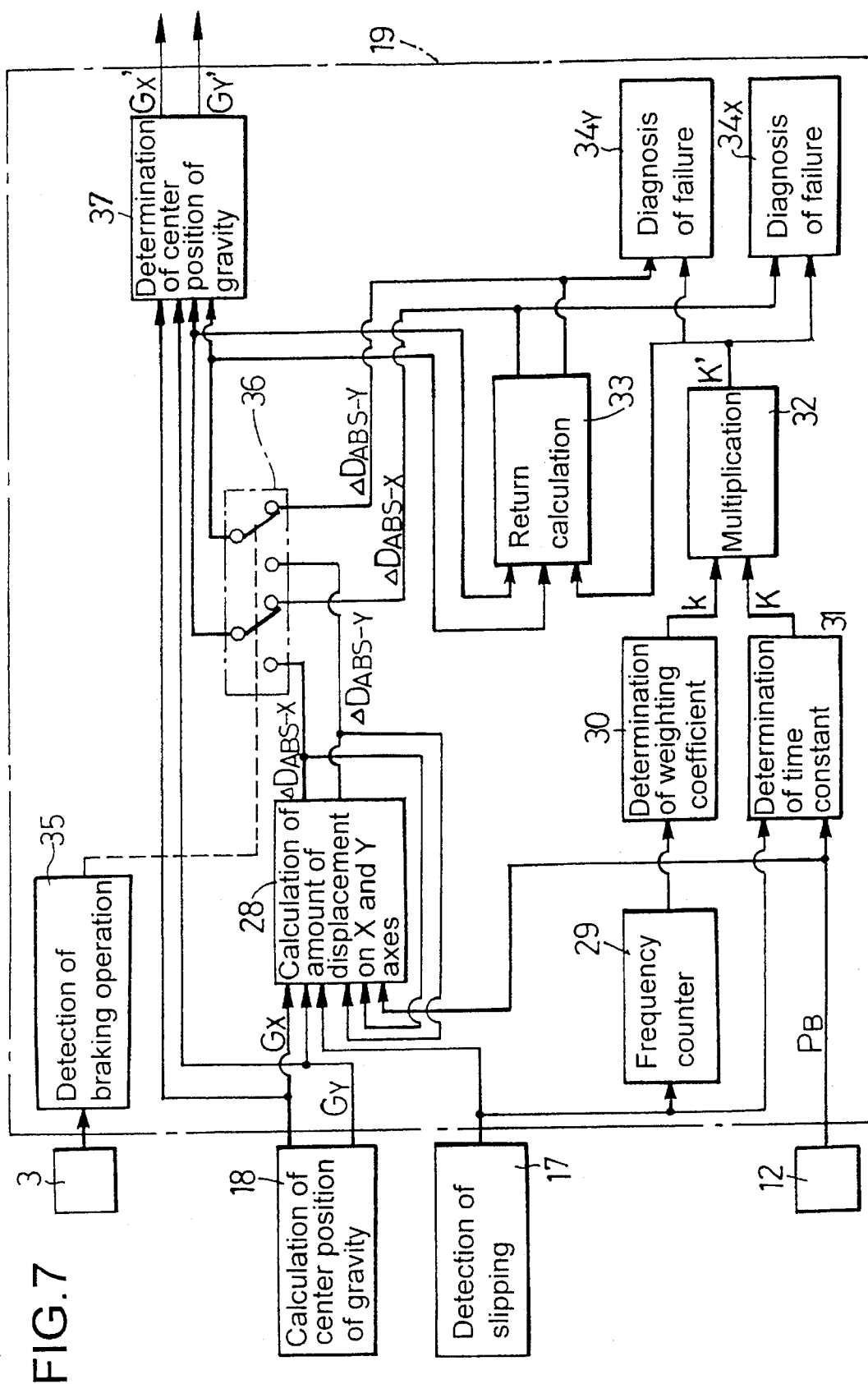
FIG. 7 is a block diagram illustrating an arrangement of a forced gravity center position-displacement amount calculating means.

Referring to FIG. 7, the center of gravity position forced-displacement amount calculating means 19 calculates the amount of forced displacement of the center of gravity position in order to correct the apparent center of gravity position, so that the apparent center of gravity position, determined by the gravity-center position calculating means 18 upon detection of the slipping of the wheel by the slip detecting means 17, is displaced away from the wheel on a straight line connecting the wheel in the slipping state with the apparent center of gravity position of the vehicle as viewed in a plane. The center of gravity position forced-displacement amount calculating means 19 includes an X- and Y-axis displacement amount calculating section 28 for calculating an amount $\Delta D_{ABS-X}$ of displacement in a direction of the X axis and an amount $\Delta D_{ABS-Y}$ of displacement in a direction of the Y axis on the basis of outputs from the slip detecting means 17, the center of gravity position calculating means 18 and the braking fluid pressure detecting sensor 12, a frequency counter 29 for counting the frequency of slipping states on the basis of the output from the slip detecting means 17 by increasing the number of slipping states when the same wheel has been successively fallen into slipping state and by decreasing the number of slipping states when the different wheels have been irregularly fallen into slipping states, a weighting coefficient determining section 30 for determining a weighting coefficient k in accordance with an output from the frequency counter 29, a time constant determining section 31 for determining a time constant K in accordance with the braking fluid pressure $P_B$ detected by the braking fluid pressure detecting sensor 12, when the slipping state of the wheel has been detected by the slip detecting means 17, a multiplying section 32 for multiplying the weighting coefficient k to the time constant K to provide a corrected time constant K', a return calculating section 33 for calculating an amount $\Delta D_{ABS-X}$ of displacement in the direction of the X axis and an amount $\Delta D_{ABS-Y}$ of displacement in the direction of the Y axis at a return time to return the forcedly displaced center position of gravity with completion of the braking operation, failure diagnosis sections $34_X$, $34_Y$ for diagnosing a failure on the basis of the corrected time constant K' determined in the multiplying section 32 and an output from the return calculating section 33, a braking operation detecting section 35 for detecting a braking operation on the basis of an output from the depression force detecting sensor 3, a switch circuit 36 for alternatively selecting either one of an output from the X- and Y-axis displacement amount calculating section 28 and an output from the return calculating section 33 on the basis of the output from the depression force detecting sensor 3, and a center of gravity position determining section 37 for determining a center position of gravity in accordance with an output from the center of gravity position calculating means 18 and an output from the switch circuit 36.

In the X- and Y-axis displacement amount calculating section 28, the amount $\Delta D_{ABS-X}$ of displacement in the X-axis direction and the amount of $\Delta D_{ABS-Y}$ of displacement in the Y-axis direction are calculated according to following expressions (3) and (4);

$$\Delta D_{ABS-X} = \Delta D_{ABS-X}^{-1} + \Delta X_{ABS-FR} + \Delta X_{ABS-FL} + \Delta X_{ABS-RR} + \Delta X_{ABS-RL} \quad (3)$$

$$\Delta D_{ABS-Y} = \Delta D_{ABS-Y}^{-1} + \Delta Y_{ABS-FR} + \Delta Y_{ABS-FL} + \Delta Y_{ABS-RR} + \Delta Y_{ABS-RL} \quad (4)$$

In the above expressions (3) and (4), each of $\Delta D_{ABS-X}^{-1}$, $\Delta D_{ABS-Y}^{-1}$ is a last amount of displacement; each of $\Delta X_{ABS-FR}$, $\Delta X_{ABS-FL}$, $\Delta X_{ABS-RR}$, $\Delta X_{ABS-RL}$ is an amount of displacement in the X-axis direction which is calculated when corresponding one of the right front wheel $W_{FR}$, the left front wheel $W_{FL}$, the right rear wheel $W_{RR}$, the left rear wheel $W_{RL}$ has been fallen into its slipping state; and each of $\Delta Y_{ABS-FR}$, $\Delta Y_{ABS-FL}$, $\Delta Y_{ABS-RR}$, $\Delta Y_{ABS-RL}$ is an amount of displacement in the Y-axis direction which is calculated when corresponding one of the right front wheel $W_{FR}$, the left front wheel $W_{FL}$, the right rear wheel $W_{RR}$ and the left rear wheel $W_{RL}$ has fallen into its slipping state.

Figure 8:
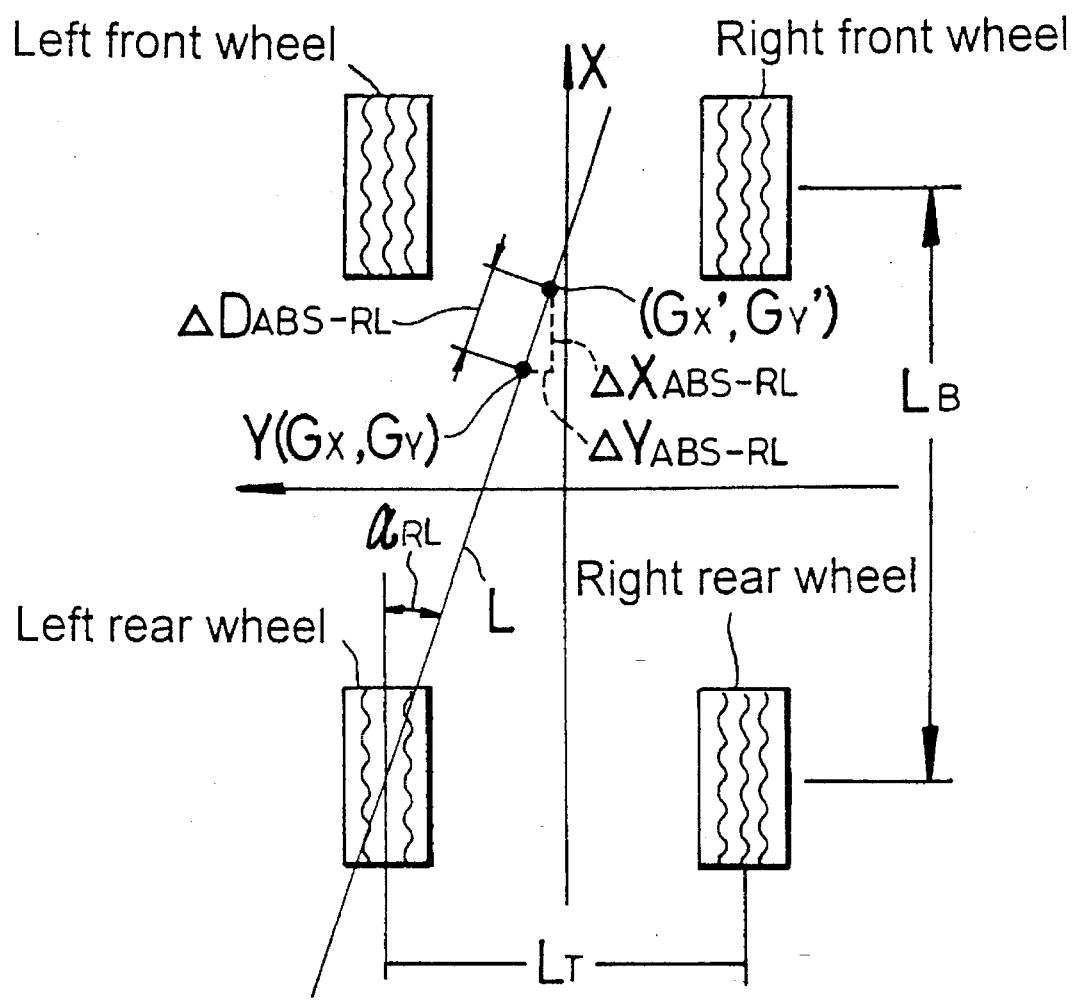
FIG. 8 is a diagram for explaining the forced displacement of the center position of gravity on the X and Y coordinates.

Suppose that the slipping state of the left rear wheel $W_{RL}$ has been detected by the slip detecting means 17, as shown in FIG. 8. In this case, the apparent center of gravity position ($G_X$, $G_Y$), attendant on a variation in load during traveling of the vehicle, is forcedly displaced away from the left rear wheel $W_{RL}$ on a straight line L connecting the left rear wheel $W_{RL}$ with the apparent center of gravity position ($G_X$, $G_Y$) of the vehicle, as viewed in a plane, by a forced displacement amount $\Delta D_{ABS-RL}$, which is calculated according to the following expression (5):

$$\Delta D_{ABS-RL} = D_{ABS-R} \times (D_{TIRE} - D_{G-RL})/D_{TIRE} \quad (5)$$

Likewise, when the right rear wheel $W_{RR}$, the left front wheel $W_{FL}$ and the right front wheel $W_{FR}$ have been fallen into their slipping states, the apparent center of gravity position is forcedly displaced away from the wheels $W_{RR}$, $W_{FL}$, $W_{FR}$ on straight lines connecting the wheels $W_{RR}$, $W_{FL}$, $W_{FR}$ with the apparent center of gravity position $(G_X, G_Y)$ of the vehicle, as viewed in a plane, by forced displacement amounts $\Delta D_{ABS-RR}$, $\Delta D_{ABS-FL}$, $\Delta D_{ABS-FR}$, respectively, which are calculated according to following expressions (6), (7) and (8), respectively:

$$\Delta D_{ABS-RR} = D_{ABS-R} \times (D_{TIRE} - D_{G-RR})/D_{TIRE} \quad (6)$$

$$\Delta D_{ABS-FL} = D_{ABS-F} \times (D_{TIRE} - D_{G-FL})/D_{TIRE} \quad (7)$$

$$\Delta D_{ABS-FR} = D_{ABS-F} \times (D_{TIRE} - D_{G-FR})/D_{TIRE} \quad (8)$$

In these expressions (5) to (8), $D_{TIRE}$ is a diagonal wheel distance and represented by $D_{TIRE} = (L_B^2 + L_T^2)^{1/2}$; each of $D_{G-RL}$, $D_{G-RR}$, $D_{G-FL}$, $D_{G-FR}$ is a distance between each of the left rear wheel $W_{RL}$, the right rear wheel $W_{RR}$, the left front wheel $W_{FL}$, and the right front wheel $W_{FR}$ and the apparent center of gravity position $(G_X, G_Y)$; and each of $D_{ABS-F}$, $D_{ABS-R}$ is a constant determined by a braking fluid pressure when the corresponding wheel has fallen into its slipping state, and is set such that $D_{ABS-R} > D_{ABS-F}$. Thus, the amount of displacement toward the front wheels is larger than the amount of displacement toward the rear wheels.

Referring again to FIG. 8, if an angle formed by the straight line L and the X-axis direction is represented by $\alpha_{RL}$, a following expression is established:

$$\alpha_{RL} = \tan^{-1}[\{G_Y - (L_T/2)\}/\{G_X - (-L_B/2)\}]$$

and the amount $\Delta X_{ABS-RL}$ of displacement in the X-axis direction and the amount of $\Delta Y_{ABS-RL}$ of displacement in the Y-axis direction are determined by following expressions:

$$\Delta X_{ABS-RL} = \Delta D_{ABS-RL} \times \cos \alpha_{RL} \quad (9)$$

$$\Delta Y_{ABS-RL} = \Delta D_{ABS-RL} \times \sin \alpha_{RL} \quad (10)$$

Likewise, when it has been detected that the right rear wheels $W_{RR}$, the left front wheel $W_{FL}$ and the right front wheel $W_{FR}$ have been fallen into their slipping states, the amounts $\Delta X_{ABS-RR}$, $\Delta X_{ABS-FL}$, $\Delta X_{ABS-FR}$ of displacement in the X-axis direction and the amounts $\Delta Y_{ABS-RR}$, $\Delta Y_{ABS-FL}$, $\Delta Y_{ABS-FR}$ of displacement in the Y-axis direction are determined by following expressions:

When the right rear wheel $W_{RR}$ has been fallen into its slipping state:

$$\Delta X_{ABS-RR} = \Delta D_{ABS-RR} \times \cos \alpha_{RR} \quad (11)$$

$$\Delta Y_{ABS-RR} = \Delta D_{ABS-RR} \times \sin \alpha_{RR} \quad (12)$$

When the left front wheel $W_{FL}$ has been fallen into its slipping state, $$\Delta X_{ABS-FL} = \Delta D_{ABS-FL} \times \cos \alpha_{FL} \quad (13)$$

$$\Delta Y_{ABS-FL} = \Delta D_{ABS-FL} \times \sin \alpha_{FL} \quad (14)$$

When the right front wheel $W_{FR}$ has fallen into its slipping state, $$\Delta X_{ABS-FR} = \Delta D_{ABS-FR} \times \cos \alpha_{FR} \quad (15)$$

$$\Delta Y_{ABS-FR} = \Delta D_{ABS-FR} \times \sin \alpha_{FR} \quad (16)$$

Therefore, the amount $\Delta D_{ABS-X}$ of displacement in the X-axis direction and the amount $\Delta D_{ABS-Y}$ of displacement in the Y-axis direction are determined according to the above-described expressions (3), (4) and (9) to (16). This calculation is continued until all the four wheels are released from their locked states, or until the need for the ABS control of both the rear wheels $W_{RR}$, $W_{RL}$ is eliminated, but the ABS control of both the front wheels $W_{FR}$, $W_{FL}$ is carried out.

The braking operation detecting section 35 delivers a high level signal, when it has been decided by the output from the depression force detecting sensor 3 that the braking operation is being conducted. The switch circuit 36 is switchable between a state in which the amount $\Delta D_{ABS-X}$ of displacement in the X-axis direction and the amount $\Delta D_{ABS-Y}$ of displacement in the Y-axis direction delivered from the return calculating section 33 when the output from the braking operation detecting section 35 is of a low level, i.e., during non-braking, are applied to the center of gravity position determining section 37, and a state in which the amount $\Delta D_{ABS-X}$ of displacement in the X-axis direction and the amount $\Delta D_{ABS-Y}$ of displacement in the Y-axis direction delivered from the return calculating section 33 when the output from the braking operation detecting section 35 is of a high level, i.e., during braking, are applied to the center of gravity position determining section 37.

In the center of gravity position determining section 37, the center of gravity position $(G_X', G_Y')$, after being forcedly displaced, is determined from the output $G_X$, $G_Y$ from the center of gravity position calculating means 18 and the outputs $\Delta D_{ABS-X}$, $\Delta D_{ABS-Y}$ from the switch circuit 36 according to following expressions (17) and (18):

$$G_X' = G_X + \Delta D_{ABS-X} \quad (17)$$

$$G_Y' = G_Y + \Delta D_{ABS-Y} \quad (18)$$

The frequency counter 29 counts the frequency of slipping states into which the wheel is fallen. The frequency of slipping states is counted by increasing the number of slipping states when the same wheel has been successively fallen into a slipping state and by decreasing the number of slipping states when the different wheels have been irregularly fallen into slipping states.

Figure 9:
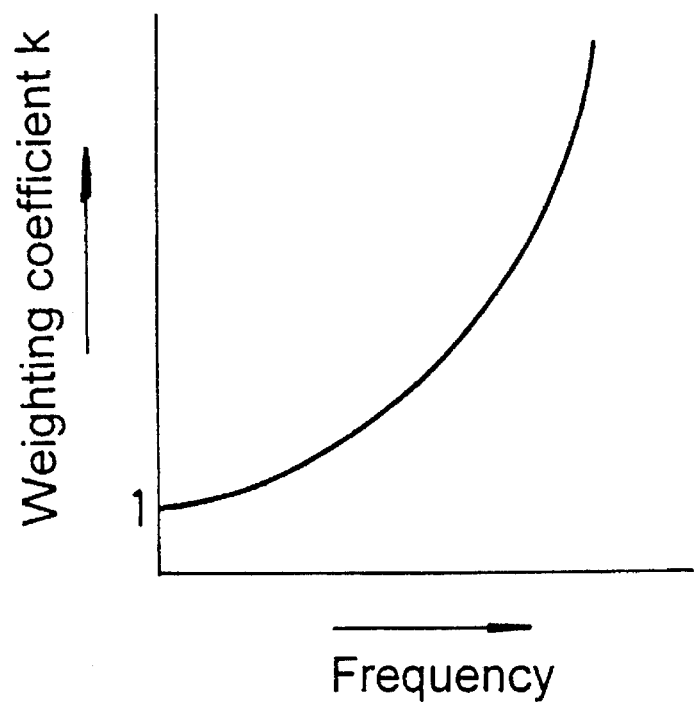
FIG. 9 is a graph illustrating an established map of weighting coefficient.

In the weighting coefficient determining section 30, a map of weighting coefficient k determined in accordance with the frequency counted by the frequency counter 29 is previously prepared, as shown in FIG. 9. And a weighting coefficient k is determined on the basis of this map. Thus, the weighting coefficient k is "1" when a frequency is "0" and becomes larger than "1" as the frequency is increased. The weighting coefficient k is increased, as the slipping of the same wheel is successive.

Figure 10:
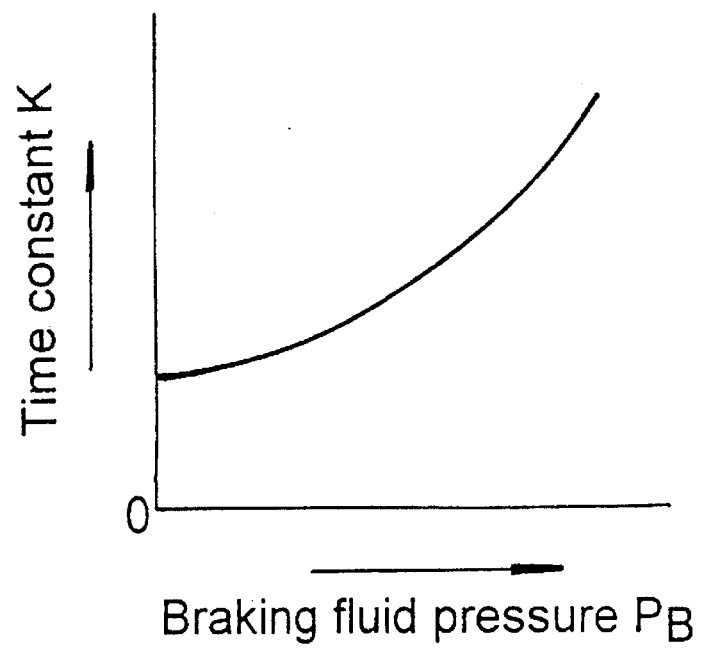
FIG. 10 is a graph illustrating an established map of time constant.

In the time constant determining section 31, a map of time constant K, determined in accordance with the braking fluid pressure $P_B$ at the time of detection of the slipping state of the wheel by the slip detecting means 17, is previously prepared, as shown in FIG. 10. And a time constant K is determined on the basis of this map. Thus, the time constant K is increased, as the braking fluid pressure $P_B$, at the time of occurrence of the slipping of the wheel, is increased. In other words, a condition in which the braking fluid pressure $P_B$, at the time of occurrence of the slipping of the wheel is large, is a condition in which the friction coefficient of a travel road surface is relatively high. Therefore, the time constant K is determined to be larger, as the friction coefficient of a travel road surface is larger, i.e., on a road surface on which the wheel is more difficult to slip.

In the multiplying section 32, the weighting coefficient k is multiplied by the time constant K to provide a corrected time constant K'. Because the time constant K is determined such that it is larger, as the friction coefficient of a travel road surface is larger, and the weighting coefficient k is determined to be larger, as the slipping of the same wheel is more successive, the corrected time constant K' is larger, as the friction coefficient of a travel road surface is larger, or as the slipping of the same wheel is more successive.

In the return calculating section 32, the outputs from the switch circuit 36, i.e., $\Delta D_{ABS-X}$, $\Delta D_{ABS-Y}$ are received, and the amount of $\Delta D_{ABS-X}$ of displacement in the X-axis direction and the amount of $\Delta D_{ABS-Y}$ of displacement in the Y-axis direction are calculated according to a linear delay function having the corrected time constant K' at a returning time to return the forcedly displaced center position of gravity upon the completion of the braking operation. As the time constant K' is larger, the output from the return calculating section 32 is smaller and hence, the returning speed becomes slower.

Figure 11:
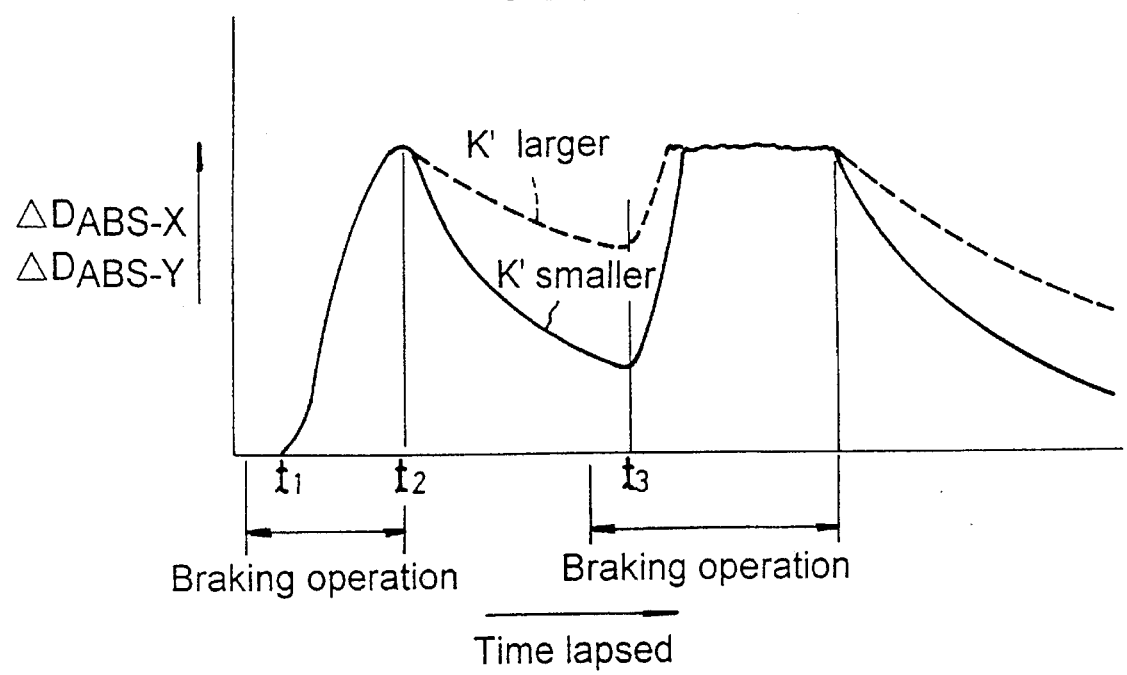
FIG. 11 is a diagram illustrating one example of a variation in displacement amount on X and Y axes in accordance with a braking operation.

Thus, for example as shown in FIG. 11, the $\Delta D_{ABS-X}$, $\Delta D_{ABS-Y}$ are increased from a time point t1 at which the slipping of a wheel occurs during a first braking operation, and the forced displacement of the apparent center position of gravity is carried out, and the return calculation is carried out from a time point t2 at which the braking operation is completed. In this case, when the corrected time constant K' is "larger", $\Delta D_{ABS-X}$, $\Delta D_{ABS-Y}$ are decreased relatively slowly, as shown by a dashed line in FIG. 11, and when the corrected time constant K' is "smaller", the $\Delta D_{ABS-X}$, $\Delta D_{ABS-Y}$ are decreased relatively rapidly, as shown by a solid line in FIG. 11. The determination of the returning speed by the time constant K' in this manner ensures that if the slipping of the wheel during braking occurs relatively frequently, the ABS control is started in a condition in which $\Delta D_{ABS-X}$, $\Delta D_{ABS-Y}$ are not returned to "0", at a time point t3 at which the slipping of the wheel occurs due to a second braking operation, so that $\Delta D_{ABS-X}$, $\Delta D_{ABS-Y}$ are increased again, and as a result, a short time is only required until $\Delta D_{ABS-X}$, $\Delta D_{ABS-Y}$ are stabilized, leading to an enhanced responsiveness.

Figure 12:
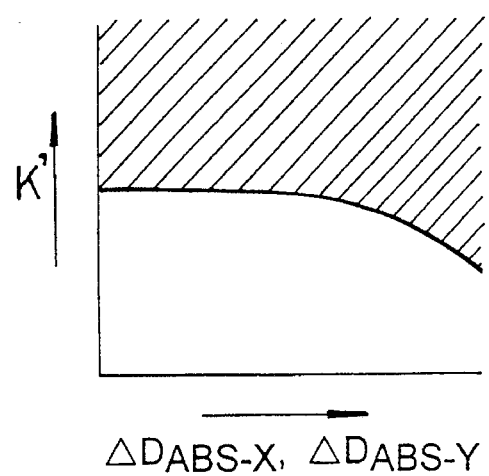
FIG. 12 is a diagram illustrating a failure diagnosis map.

In the failure diagnosis sections $34_X$, $34_Y$, maps are established as shown in FIG. 12 by the corrected time constant K' and the outputs $\Delta D_{ABS-X}$, $\Delta D_{ABS-Y}$ from the returning calculating section 33. When the time constant K' is in a relatively large region (a region indicated by oblique lines), it is decided that there is a failure, and an alarm is given, or another processing is performed. That is, a larger time constant K' indicates that the same wheel has been successively fallen several times into slipping states, or the wheel slipping has occurred on a road surface of a high friction coefficient where the wheel slipping is difficult to occur. Therefore, when the time constant K' is larger, it can be decided that a mechanism such as a tire or a brake is abnormal. In the failure diagnosis sections $34_X$, $34_Y$, a signal indicative of a failure is delivered. In this case, it is desirable that return calculation of the $\Delta D_{ABS-X}$, $\Delta D_{ABS-Y}$ is stopped, $\Delta D_{ABS-X}$, $\Delta D_{ABS-Y}$ are maintained until the engine is stopped.

Figure 13:
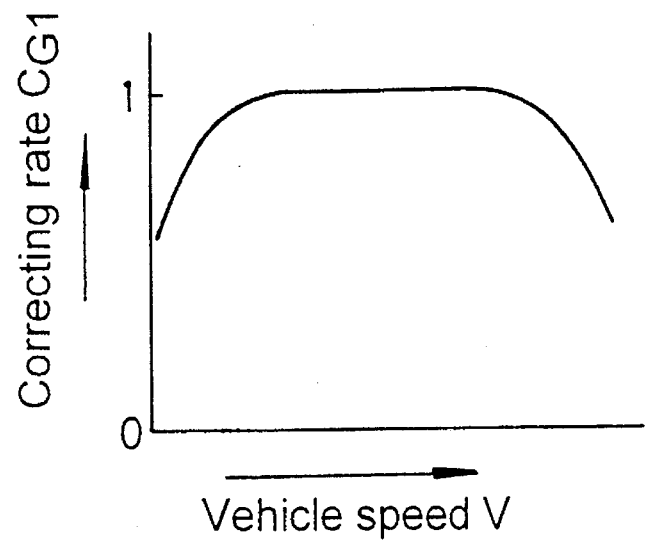
FIG. 13 is a graph illustrating the correction rate corresponding to the vehicle speed.

Referring again to FIG. 2, the vehicle speed V determined in the vehicle speed calculating means 16 is supplied to a vehicle speed-correspondence correcting rate determining means 38, where a corrected rate $C_{G1}$, corresponding to the vehicle speed V, is determined on the basis of a map previously established as shown in FIG. 13. The maximum value of such correcting rate $C_{G1}$ is "1".

Figure 14:
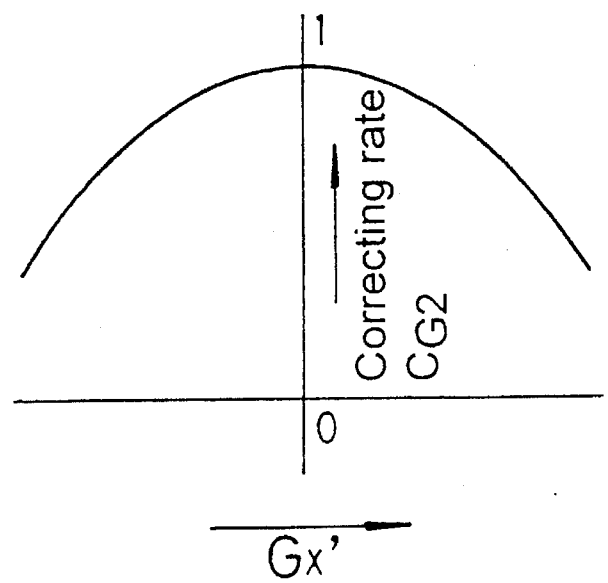
FIG. 14 is a graph illustrating the correction rate corresponding to the X coordinate of the center position of gravity after forced displacement.

The X coordinate $G_X'$ of the center of gravity position, after being forcedly displaced, which has been determined in the gravity-center position forced-displacement amount calculating means 19, is supplied to a longitudinal acceleration-correspondence correcting rate determining means 39, where a correcting rate $C_{G2}$ corresponding to an X coordinate $G_X'$ is determined on the basis of a map previously established as shown in FIG. 14. Here, the map is determined in consideration of a weight balance of the vehicle, a tire size, and the like, on the basis of the fact that the X coordinate $G_X'$ governs the longitudinal distribution of braking force and is dependent upon a longitudinal force/load characteristic of the tire, and the maximum value of the correcting rate $C_{G2}$ is "1".

Figure 15:
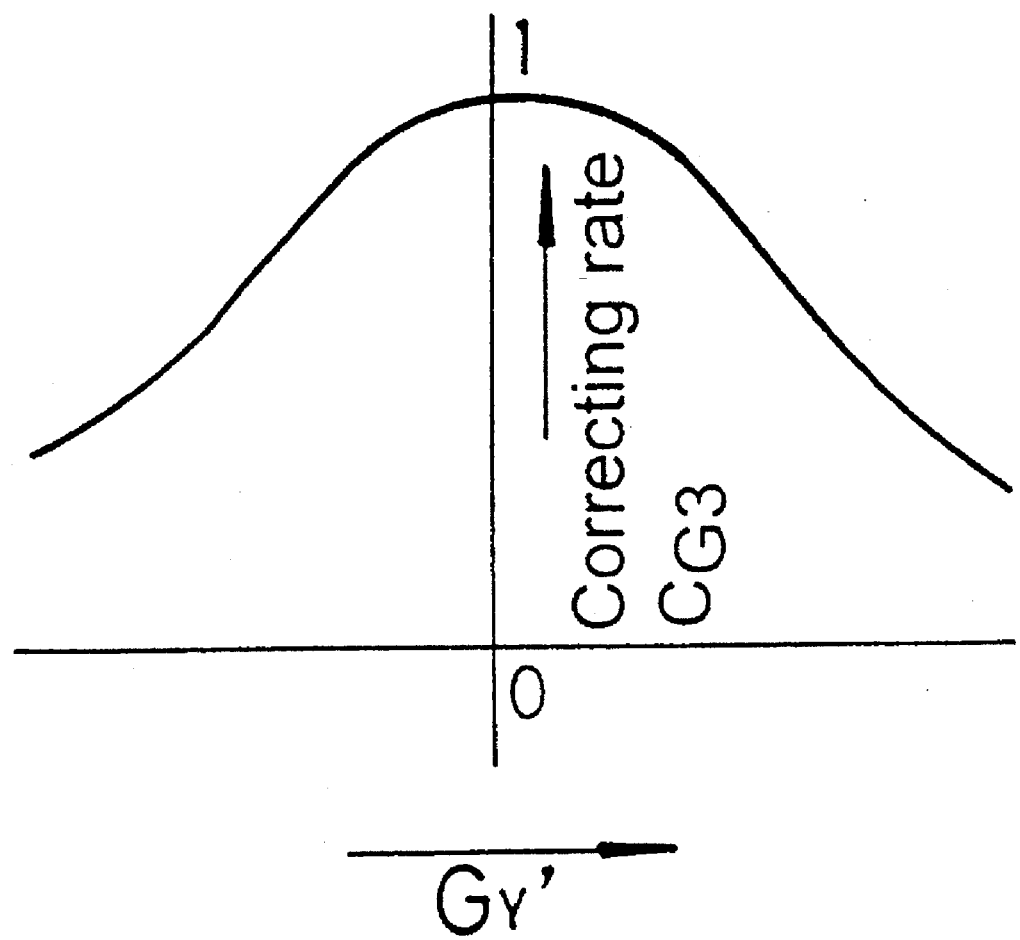
FIG. 15 is a graph illustrating the correction rate corresponding to the Y coordinate of the center position of gravity after forced displacement.

Further, the Y coordinate $G_Y'$ of the center position of gravity, after being forcedly displaced, which has been determined in the gravity-center position forced-displacement amount calculating means 19, is supplied to a lateral acceleration-correspondence correcting rate determining means 40, where a correcting rate $C_{G3}$, corresponding to the Y coordinate $G_Y'$, is determined on the basis of a map previously established as shown in FIG. 15. Here, the map is determined in consideration of a weight balance of the vehicle and the like on the basis of the fact that the Y coordinate $G_Y'$ governs the longitudinal distribution of braking force and is dependent upon a side force/longitudinal force characteristic of the tire, and the maximum value of the correcting rate $C_{G3}$ is "1".

The correcting rates $C_{G1}$, $C_{G2}$, $C_{G3}$ determined in this manner are supplied to an averaging calculation means 41, where a sum total of the correcting rates $C_{G1}$, $C_{G2}$, $C_{G3}$ are divided by a correcting element number, i.e., by 3 to provide an averaged correcting rate $C_{GA1}$. The averaged correcting rate $C_{GA1}$ is supplied to a gain correcting means 15, where a gain correction is carried out by multiplying the first corrected total braking fluid pressure $P_{T1}$ by the correcting rate $C_{GA1}$, thereby providing a second gain-corrected total brake fluid pressure $P_{T2}$.

With the above-described the gain correction, as the correcting rate $C_{GA1}$ is smaller, the braking force is weaker; the wheel is more difficult to become locked; a cornering force is maintained, and the stability of the vehicle body is enhanced. Depending upon which of the braking force or the stability is more important, the maps in FIGS. 13 to 15 may be adjusted.

By adopting a corrected map corresponding to a brake depression force, a speed of variation in brake depression force, or the like, it is possible to enhance the brake feeling by a precise gain correction. Further, when a portion of each of the elements to be corrected is not corrected, the correcting rate for such element to be corrected may be set at "1".

Figure 16:
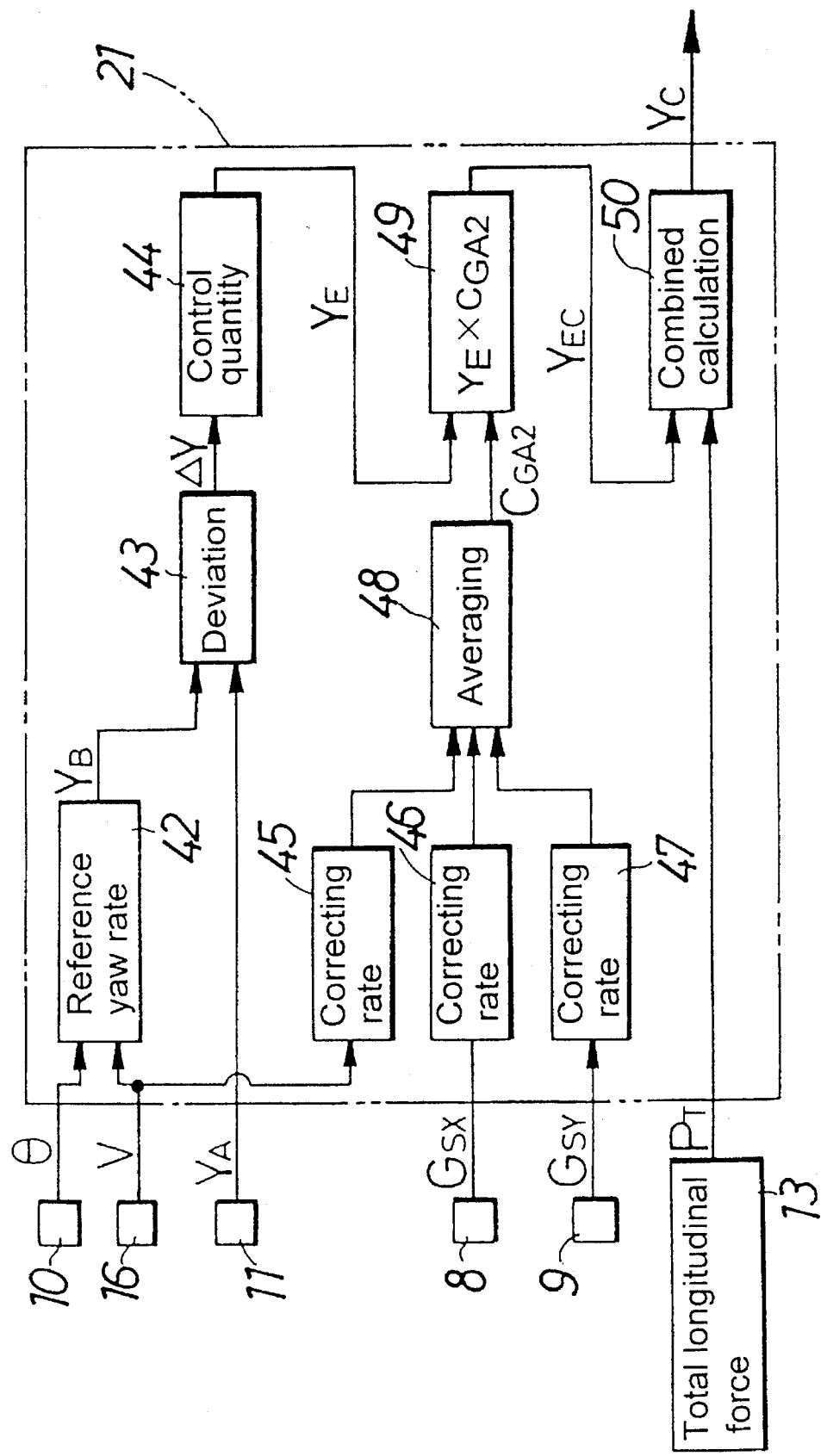
FIG. 16 is a block diagram illustrating an arrangement of a yaw control quantity calculating means.

Referring to FIG. 16, the yaw control quantity calculating means 21 includes a reference yaw rate calculating section 42 for calculating a reference yaw rate $Y_B$ as a target turn amount on the basis of the vehicle speed V determined in the vehicle speed calculating means 16 and the steering angle Θ, detected by the steering angle detecting sensor 10, a deviation calculating section 43, for calculating a deviation ΔY between an actual yaw rate $Y_B$ detected by the yaw rate detecting sensor 11 and the reference yaw rate $Y_B$, a control quantity calculating section 44, for calculating a yaw control quantity $Y_E$ by a PID calculation based on the deviation ΔY, a vehicle speed-correspondence correcting rate determining section 45, for determining a correcting rate $C_{G4}$ corresponding to the vehicle speed V determined in the vehicle speed calculating means 16, a longitudinal acceleration-correspondence correcting rate determining section 46, for determining a correcting rate $C_{G5}$ corresponding to the longitudinal acceleration $G_{SX}$ detected by the longitudinal acceleration detecting sensor 8, a lateral acceleration-correspondence correcting rate determining section 47, for determining a correcting rate $C_{G6}$ corresponding to the lateral acceleration $G_{SY}$ obtained by the lateral acceleration detecting sensor 9, an averaging calculation section 48, for averaging the correcting rates $C_{G4}$, $C_{G5}$ and $C_{G6}$ to provide an averaged correcting rate $C_{GA2}$, a gain correcting section 49, for providing a gain correction by multiplying the correcting rate $C_{GA2}$ by the yaw control quantity $Y_E$, and a combined calculation section 50, for calculating a yaw control quantity combined with a control of braking fluid pressure on the basis of the total braking fluid pressure $P_T$ determined in the total longitudinal force determining means 13 and a yaw control quantity $Y_{EC}$ corrected with the gain correction.

Figure 17:
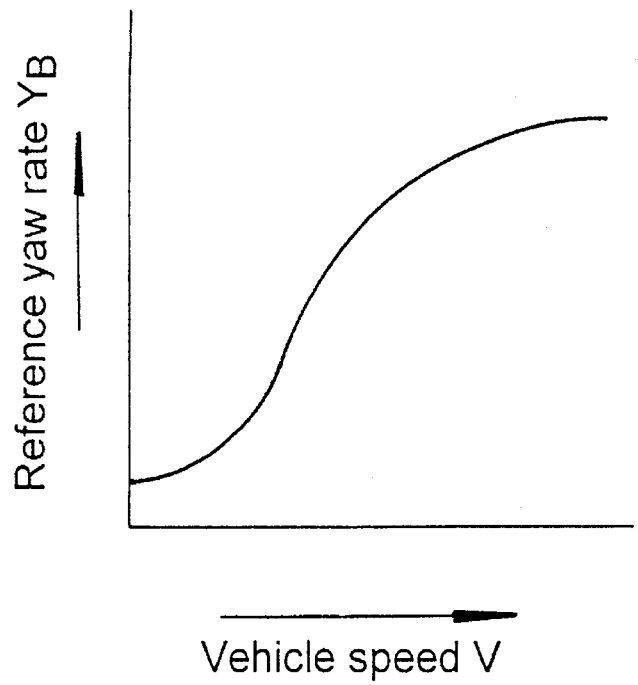
FIG. 17 is a graph illustrating the reference yaw rate corresponding to the vehicle speed.

In the reference yaw rate calculating section 42, a yaw rate transfer function is calculated for each of input steering angles θ, e.g., for each of a plurality of vehicle speeds V set at intervals of 10 km/hr, thereby establishing a map as shown in FIG. 17. A reference yaw rate $Y_B$ is obtained by an interpolation in correspondence to the input vehicle speed V. Thus, a suitable reference yaw rate $Y_B$ is obtained even during a braking operation providing a large variation in speed.

Figure 18:
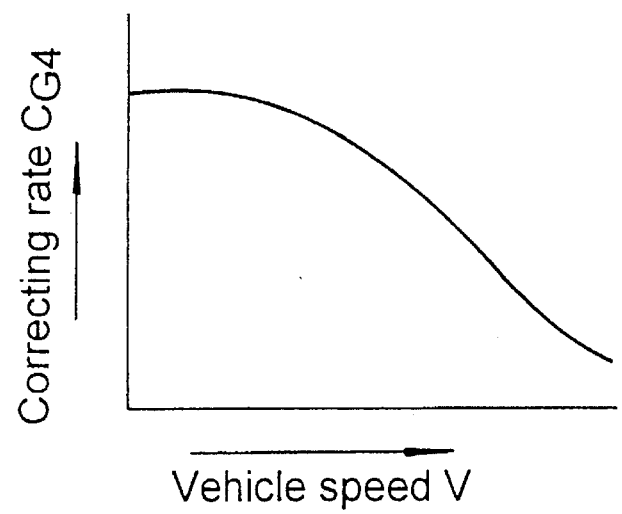
FIG. 18 is a graph illustrating the correction rate corresponding to the vehicle speed.
Figure 19:
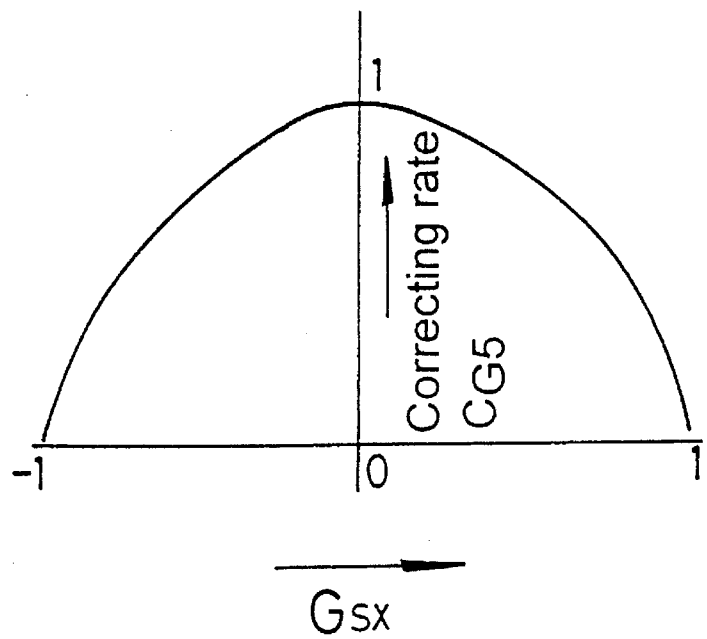
FIG. 19 is a graph illustrating the correction rate corresponding to the longitudinal acceleration.
Figure 20:
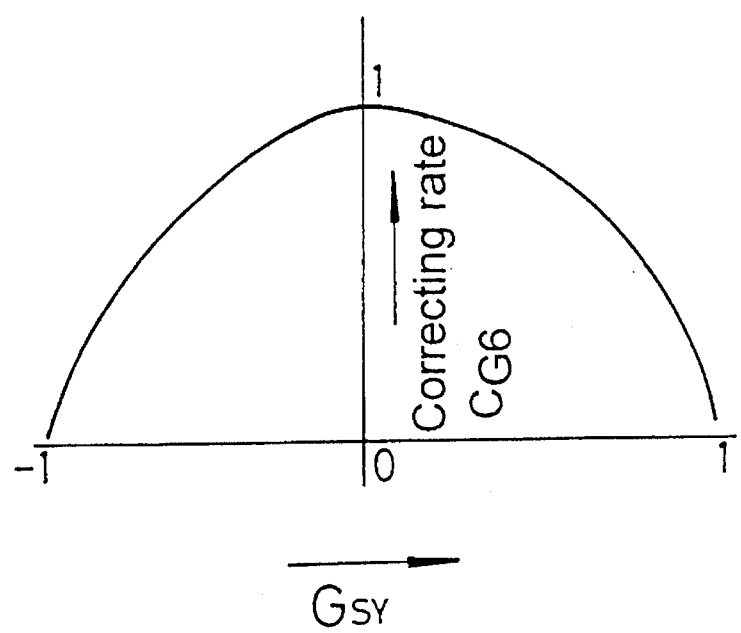
FIG. 20 is a graph illustrating the correction rate corresponding to the lateral acceleration.

In the vehicle speed-correspondence correcting rate determining section 45, the correcting rate $C_{G4}$, corresponding to the vehicle speed V, is determined on the basis of a map previously established, as shown in FIG. 18. In the longitudinal acceleration-correspondence correcting rate determining section 46, the correcting rate $C_{G5}$, corresponding to the longitudinal acceleration $G_{SX}$, is determined on the basis of a map previously established, as shown in FIG. 19. In the lateral acceleration-correspondence correcting rate determining section 47, the correcting rate $C_{G6}$, corresponding to the lateral acceleration $G_{SY}$, is determined on the basis of a map previously established as shown in FIG. 20.

The correcting rates $C_{G4}$, $C_{G5}$, $C_{G6}$, obtained in this matter, are supplied to the averaging calculation section 48, where the sum total of the correcting rates $C_{G4}$, $C_{G5}$, $C_{G6}$ is divided by 3 to provide an averaged correcting rate $C_{GA2}$. In the gain correcting section 49, the yaw control quantity $Y_E$ is multiplied by the averaged correcting rate $C_{GA2}$ to provide a gain-corrected yaw control quantity $Y_{EC}$.

In the combined calculation section 50, a calculation according to $Y_C = Y_{EC} \times (2/P_T)$ is carried out on the basis of the gain-corrected yaw control quantity $Y_{EC}$ and the total braking fluid pressure $P_T$, and a yaw rate control quantity $Y_C$, combined with the control of braking fluid pressure, is delivered from the combined calculation section 50.

In the shared-load proportion calculating means 22, shared-load proportions $R_{FR}$, $R_{FL}$, $R_{RR}$, $R_{RL}$ are determined by calculating loads shared to the four wheels, after forced displacement of the center of gravity position, calculating amounts of distribution of the yaw control quantity $Y_C$ to the four wheels and further combining them.

More specifically, as a result of an apparent variation in center of gravity position, a load $WT_F$ on the side of both the front wheels $W_{FR}$ and $W_{FL}$ is equal to $(0.5 \times L_B + G_X') \times WT_T / L_B$, and a load $WT_{TR}$ on the side of both the front wheels $W_{RR}$, $W_{RL}$ is equal to $(WT_T - WT_F)$. If the loads shared to the right front wheel $W_{FR}$, the left front wheel $W_{FL}$, the right rear wheel $W_{RR}$, the left rear wheel $W_{RL}$, after variation in load, are represented by $WT_{FR}'$, $WT_{FL}'$, $WT_{RR}'$, $WT_{RL}'$, respectively, these shared loads $WT_{FR}'$, $WT_{FL}'$, $WT_{RR}'$, $WT_{RL}'$ are represented by following expressions:

$$WT_{FL}' = (0.5 \times L_T + G_Y') \times WT_F / L_T \qquad (19)$$

$$WT_{FR}' = WT_F - WT_{FL}' \qquad (20)$$

$$WT_{RL}' = (0.5 \times L_T + G_Y') \times WT_R / L_T \qquad (21)$$

$$WT_{RR}' = WT_R - WT_{RL}' \qquad (22)$$

If the amounts of distribution to the right front wheel $W_{FR}$, the left front wheel $W_{FL}$, the right rear wheel $W_{RR}$ and the left rear wheel $W_{RL}$, after variation in load, are represented by $Y_{CFR}$, $Y_{CFL}$, $Y_{CRR}$, $Y_{CRL}$, respectively, these distribution amounts $Y_{CFR}$, $Y_{CFL}$, $Y_{CRR}$, $Y_{CRL}$ are represented by following expressions:

$$Y_{CFR} = Y_C \times \{WT_{FR}'/(WT_{FR}' + WT_{RR}')\} \qquad (23)$$

$$Y_{CFL} = Y_C \times \{WT_{FL}'/(WT_{FL}' + WT_{RL}')\} \qquad (24)$$

$$Y_{CRR} = Y_C \times \{WT_{RR}'/(WT_{FR}' + WT_{RR}')\} \qquad (25)$$

$$Y_{CRL} = Y_C \times \{WT_{RL}'/(WT_{FL}' + WT_{RL}')\} \qquad (26)$$

Further, if the shared loads $WT_{FR}'$, $WT_{FL}'$, $WT_{RR}'$, $WT_{RL}'$, and the distribution amounts $Y_{CFR}$, $Y_{CFL}$, $Y_{CRL}$, $Y_{CRL}$, are combined to find shared-load proportions $R_{FR}$, $R_{FL}$, $R_{RR}$, $R_{RL}$, they are as follows:

$$R_{FR} = (WT_{FR}' + Y_{CFR})/WT_T \qquad (27)$$

$$R_{FL} = (WT_{FL}' - Y_{CFL})/WT_T \qquad (28)$$

$$R_{RR} = (WT_{RR}' + Y_{CRR})/WT_T \qquad (29)$$

$$R_{RL} = (WT_{RL}' - Y_{CRL})/WT_T \qquad (30)$$

Thus, the sum total of the shared-load proportions $R_{FR}$, $R_{FL}$, $R_{RR}$, $R_{RL}$ is always "1".

The shared-load proportions $R_{FR}$, $R_{FL}$, $R_{RR}$, $R_{RL}$, determined in the shared-load proportion calculating means 22, are supplied to the braking fluid pressure calculating means 23$_{FR}$, 23$_{FL}$, 23$_{RR}$, 23$_{RL}$, where target braking fluid pressures $P_{FR}$, $P_{FL}$, $P_{RR}$, and $P_{RL}$, as target longitudinal forces for the respective wheels, are calculated for every wheel brakes by multiplying the second total braking fluid pressures $P_{T2}$ by the shared-load proportions $R_{FR}$, $R_{FL}$, $R_{RR}$, $R_{RL}$, respectively, and the modulators 2$_{FR}$, 2$_{FL}$, 2$_{RR}$, 2$_{RL}$ to which the drive means 24$_{FR}$, 24$_{FL}$, 24$_{RR}$, and 24$_{RL}$ correspond are operated on the basis of the target braking fluid pressures $P_{FR}$, $P_{FL}$, $P_{RR}$, $P_{RL}$.

The operation of this embodiment will be described below. The target braking fluid pressures $P_{FR}$, $P_{FL}$, $P_{RR}$, $P_{RL}$ for the wheel brakes $B_{FR}$, $B_{FL}$, $B_{RR}$, $B_{RL}$ are determined to control the modulators 2$_{FR}$, 2$_{FL}$, 2$_{RR}$, 2$_{RL}$ by determining the total braking fluid pressure $P_T$, corresponding to the total braking force exhibited by the wheel brakes $B_{FR}$, $B_{FL}$, $B_{RR}$, $B_{RL}$ mounted respectively on the wheels $W_{FR}$, $W_{FL}$, $W_{RR}$, $W_{RL}$, by calculating the shared-load proportions $R_{FR}$, $R_{FL}$, $R_{RR}$, $R_{RL}$ for every wheels $W_{FR}$, $W_{FL}$, $W_{RR}$ and $W_{RL}$, by distributing the second corrected total braking fluid pressure $P_{T2}$, determined on the basis of the total braking fluid pressure $P_T$, in accordance with the shared-load proportions $R_{FR}$, $R_{FL}$, $R_{RR}$, $R_{RL}$. Therefore, even if there is an unbalance in weight due to an increase or decrease in load or number of occupants, it is possible to maintain the stability during braking and to reduce the nose dive, and the like.

In addition, the longitudinal and lateral accelerations $G_{SX}$ and $G_{SY}$ of the vehicle are detected to calculate the apparent amounts of displacement of the center position of gravity of the vehicle. When the wheel is fallen into its slipping states during braking, the apparent center of gravity position of the vehicle is corrected, such that it is displaced toward a side away from the wheel in its slipping state on the straight line connecting the wheel in its slipping state and the apparent center position of gravity of the vehicle as viewed in the plane, thereby determining the braking forces, such that the shared load is larger on one of the front and rear wheel sides where more wheels are in non-slipping states when the slipping of the vehicle is detected. Therefore, while the total braking force, required by the occupant, is constant, it is possible to exhibit the maximum braking force within such a range.

Moreover, in the forced displacement of the apparent center of gravity position, the constants $D_{ABS-F}$ and $D_{ABS-R}$, used in the expressions (5) to (8), are set to fulfill a relationship of $D_{ABS}>D_{ABS-F}$, such that the amount of displacement toward the front wheels is larger than that toward the rear wheels. Therefore, it is possible to enhance the stability of the vehicle in such a manner that the frequency of the ABS controls performed, upon occurrence of the slipping of the wheel or wheels during braking, is more on the front wheel sides than on the rear wheel sides.

Further, since the shared load proportions $R_{FR}$, $R_{FL}$, $R_{RR}$, $R_{RL}$ for every wheels $W_{FR}$, $W_{FL}$, $W_{RR}$, $W_{RL}$ are calculated on the basis of the corrected shared load proportions $WT_{FR}'$, $WT_{FL}'$, $WT_{RR}'$, $WT_{RL}'$, it is possible when the distribution proportions are changed, to disperse the increment at a proper distribution to the wheels having an increased distribution proportion.

A situation is supposed that, if the longitudinal acceleration $G_{SX}$ and the lateral acceleration $G_{SY}$ are increased, substantially all of the braking fluid pressure is applied to the wheel brakes on the wheel side of an increased load. In this case, if the characteristic of the tire is completely proportional to the variation in load and moreover, the braking force is obtained completely independently from the cornering force, there is no problem. But in practice, this is not true. That is, the increase in upper limit of tire generation force, due to an increase in load, is gentle in an increased load region, and the cornering force and the braking force are in a strong correlation, wherein a larger braking force is obtained, when the cornering force is larger. In other words, if the vehicle is forcibly braked under such a situation, the cornering force is decreased abruptly. However, because the gain correction of the first corrected total braking fluid pressure $P_{T1}$ is carried out on the bases of the X coordinate $G_X'$ and the Y coordinate $G_Y'$, after forced displacement, the abrupt decrease in cornering force is avoided.

Moreover, by adding the yaw control quantity $Y_C$, determined on the basis of the deviation between the reference yaw rate $Y_B$ determined on the basis of the steering angel $\Theta$ and the actual yaw rate $Y_A$ to the calculating elements of the shared load proportions $R_{FR}$, $R_{FL}$, $R_{RR}$, $R_{RL}$, the distribution of the target braking fluid pressures $P_{FR}$, $P_{FL}$, $P_{RR}$, $P_{RL}$ is changed on the basis of the deviation between the target turn amount and the actual turn amount, and the sum total of the shared load proportions $R_{FR}$, $R_{FL}$, $R_{RR}$, $R_{RL}$ is made constant. Therefore, a turning motion, appropriately corresponding to a stable longitudinal acceleration and a steering operation, can be provided by distributing the braking fluid pressure while maintaining the acceleration and deceleration of the vehicle constant.

Although the embodiment of the present invention has been described in detail, it will be understood that the present invention is not limited to the above-described embodiment, and various modifications in design can be made without departing from the present invention defined in claims.

For example, although the brakes $B_{FR}$, $B_{FL}$, $B_{RR}$, $B_{RL}$ are of the same specification, and the total braking fluid pressure $P_T$ is determined as corresponding to the total braking force in the above-described embodiment, brakes which are not of the same specification may be used. In this case, the total braking force may be distributed at shared load proportions, and the braking force, after being distributed, may be converted into a braking fluid pressure to perform a control of the brakes.

In addition, although the braking force, as the wheel longitudinal force has been described as being controlled for every wheels $W_{FR}$, $W_{FL}$, $W_{RR}$, $W_{RL}$ in the above-described embodiment, the present invention is applicable to a vehicle in which the braking forces, at least on the side of the front wheels $W_{FR}$, $W_{FL}$ and on the side of the rear wheels $W_{RR}$, $W_{RL}$, are controlled collectively, and to a four-wheel drive vehicle in which the driving force as the wheel longitudinal force is controlled for every wheels $W_{FR}$, $W_{FL}$, $W_{RR}$, $W_{RL}$.

What is claimed:

1. A process for controlling a wheel longitudinal force in a vehicle in which longitudinal forces applied to a plurality of wheels ($W_{FR}$, $W_{FL}$, $W_{RR}$, $W_{RL}$) can be controlled at least on a front wheel side and on a rear wheel side, comprising the steps of:

detecting or determining a total longitudinal force which is a sum total of the longitudinal forces applied to the plurality of wheels ($W_{FR}$, $W_{FL}$, $W_{RR}$, $W_{RL}$) in accordance with a total braking fluid pressure;

controlling the longitudinal forces applied to the wheels on the basis of a front wheel-side target wheel longitudinal force and a rear wheel-side target wheel longitudinal force determined by distribution of said total longitudinal force at a predetermined distribution proportion; and detecting the presents of a slipping state for each wheel, changing said distribution proportion by increasing an amount of said distribution proportion to one of the front and rear wheel sides in which more wheels are not in the slipping state, such that the target wheel longitudinal force is larger for the one side, wherein in changing said distribution proportion, the increased amount in said distribution proportion at a time when the front wheel-side target wheel longitudinal force is increased is determined larger than the increased amount in said distribution proportion at a time when the rear wheel-side target wheel longitudinal force is increased.

2. A process for controlling the wheel longitudinal force in a vehicle in which longitudinal forces applied to the plurality of wheels ($W_{FR}$, $W_{FL}$, $W_{RR}$, $W_{RL}$) are controllable independently, comprising the steps of:

detecting or determining a total longitudinal force which is a sum total of the longitudinal forces applied to the plurality of wheels ($W_{FR}$, $W_{FL}$, $W_{RR}$, $R_{RT}$) in accordance with a total braking fluid pressure;

controlling the longitudinal forces applied to the wheels on the basis of a front wheel-side target wheel longitudinal force and a rear wheel-side target wheel longitudinal force determined by distribution of said total longitudinal force at a predetermined distribution proportion; and changing said distribution proportion such that the target wheel longitudinal force is larger on one of the front and rear wheel sides in which more wheels are in non-slipping states, when a slipping is detected in the wheels, wherein said changing said distribution proportion step further comprises the steps of:

determining loads shared to the wheels ($W_{FR}$, $W_{FL}$, $W_{RR}$, $W_{RL}$) in a stopped state of the vehicle;

providing apparent direction and amount of displacement of a center of gravity position of the vehicle on the basis of a longitudinal acceleration and of a lateral acceleration of the vehicle;

determining an apparent center of gravity position of the vehicle in accordance with said direction and amount of displacement;

correcting the apparent center of gravity position of the vehicle when slipping is detected in the wheels, such that said apparent center of gravity position of the vehicle is displaced toward a side away from a wheel in a slipping state on a straight line connecting the slipping wheel and the apparent center of gravity position of the vehicle, as viewed in a plane;

correcting said determined shared loads on the basis of a corrected apparent center of gravity position of the vehicle; and determining the distribution proportion of the wheel longitudinal force for every wheel ($W_{FR}$, $W_{FL}$, $W_{RR}$, $W_{RL}$) on the basis of corrected shared loads.

* * * * *